Nov. 14, 1950     A. B. GILBERT     2,529,492
POSITIVE CLUTCH MECHANISM
Filed Aug. 5, 1947     2 Sheets-Sheet 1
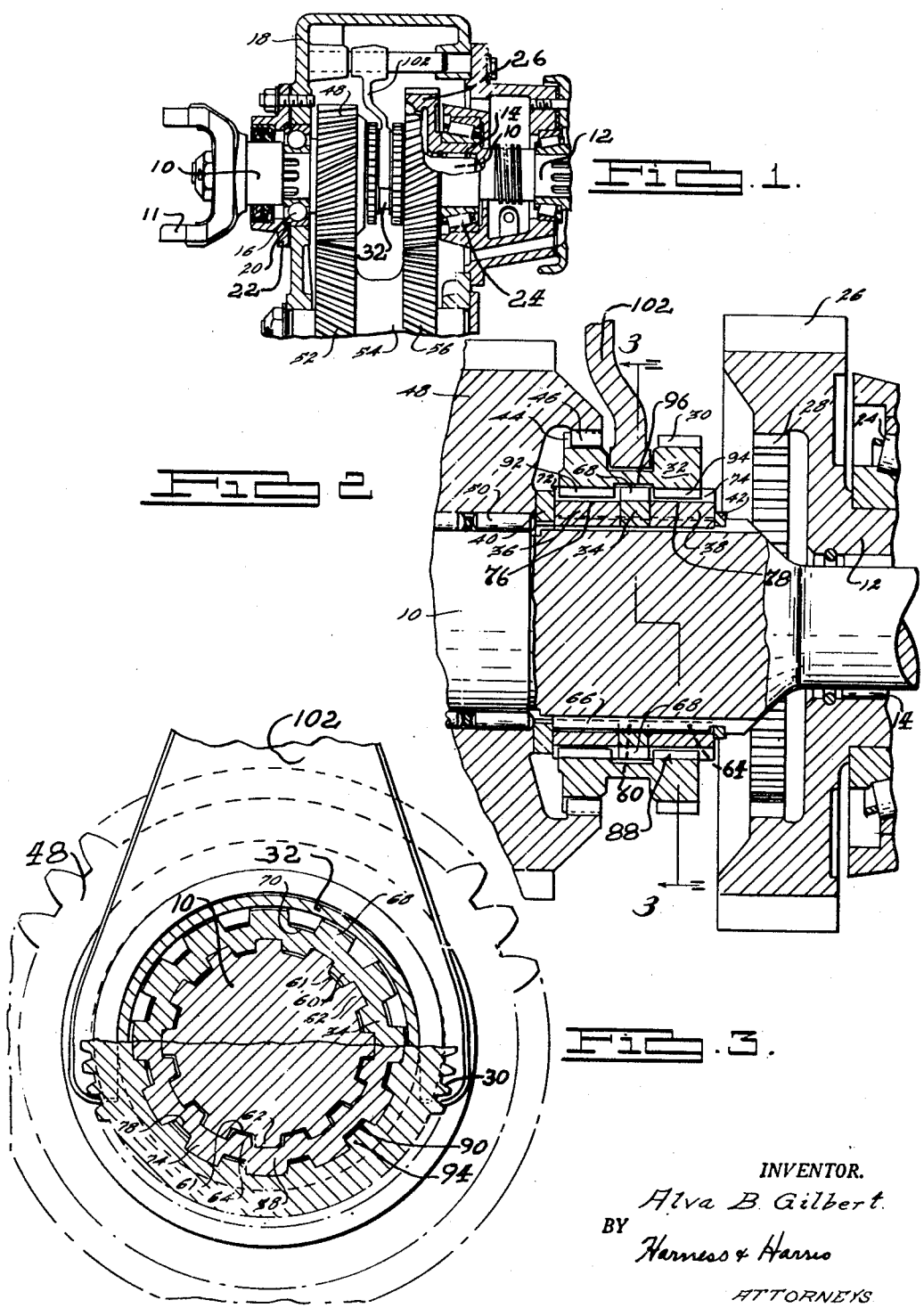
INVENTOR.
Alva B. Gilbert
BY Harness & Harris
ATTORNEYS INVENTOR.
Alva B. Gilbert.
BY Harness & Harris
ATTORNEYS.

Patented Nov. 14, 1950

2,529,492

UNITED STATES PATENT OFFICE 2,529,492

POSITIVE CLUTCH MECHANISM

Alva B. Gilbert, Detroit, Mich., assignor to Chrysler Corporation, Highland Park, Mich., a corporation of Delaware Application August 5, 1947, Serial No. 766,267

13 Claims. (Cl. 192—67)

1

This invention relates to power transmission mechanisms and refers more particularly to improvements in so-called jaw or dental clutch mechanisms employed in gearing drives of motor vehicles for selecting one or more speed ratio drives between the engine and vehicle propeller shaft, and which mechanisms include means for preventing disengagement of the clutch when established in a speed ratio drive and undergoing drive or coast torque.

For the purpose of illustrating my invention, I shall make reference to clutches of the type employed in transfer case gearing. It will, however, be understood that the invention is applicable to clutches employed in other situations.

A problem encountered with clutches of the foregoing type has been the tendency of the shiftable member to "creep" and/or "walk" out of mesh when undergoing torque, especially under coast torque conditions in low speed ratio drives. In an application for United States Letters Patent of Sidney A. Ochs and Otto E. Fishburn, Serial No. 764,410, filed July 29, 1947, a two-piece hub construction is provided designed to prevent disengagement of the shiftable member, when positioned in two different speed ratio drive relationships, the means for effecting this result differing in each drive relationship. The present invention differs in that a three-sectioned hub construction is employed and the means effecting the desired result is similar in either drive relationship and under both drive and coast torque operations.

Accordingly, it is the general object of my invention to provide mechanism for controlling creep and walking out of mesh tendencies of interengaged clutch members during rotation thereof.

A further object is to provide a clutch mechanism comprising a toothed clutch element shiftable from a neutral position into engagement with a second toothed clutch element to establish a predetermined speed ratio drive or into engagement with a third toothed element to establish a different speed ratio drive and wherein means are provided for effectively preventing walking out of engagement of the shiftable element when in either engaged position and when undergoing either drive or coast torque.

Another object of my invention is to provide clutch mechanism of the above character wherein the means for preventing disengagement of the shiftable member is brought into operation in a similar manner in either position of the shiftable member and under both coast and drive torque conditions.

2

Still another object of the invention is to provide clutch mechanism of the above character wherein blocking of the shiftable member from disengagement occurs as an incident to subjection of the shiftable clutch member to torque transmission.

Other objects and advantages of my invention will become more apparent from the following description taken in conjunction with the accompanying drawings wherein:

Fig. 1 is a sectional view of a portion of a conventional gear transfer box of an automotive truck embodying my invention;

Fig. 2 is an enlarged cross-sectional view of the clutch structure of Fig. 1;

Fig. 3 is a cross-sectional view taken at 3—3 of Fig. 2;

Figure 4:
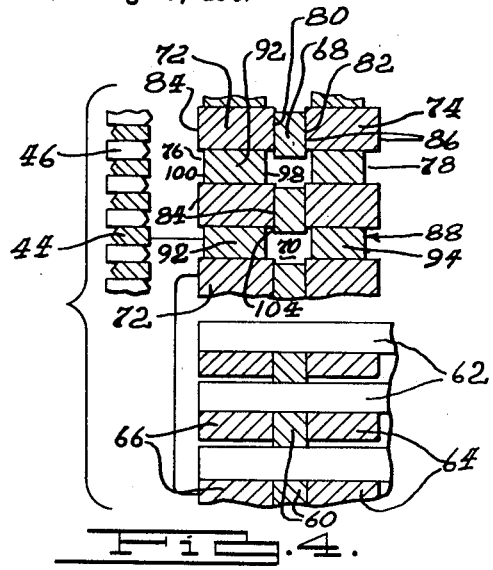
Fig. 4 is a development of the interengaged teeth of the mechanism of Fig. 2 under drive torque conditions in low speed ratio drive.

Referring to the drawings in which similar numerals refer to similar parts throughout the several views, the numeral 10 is the drive or input shaft of the transfer box mechanism adapted to receive power from a conventional gear transmission through a propeller shaft (not shown) connected by means of a universal coupling 11 splined to the shaft 10. One end of the shaft 10 is piloted in the end of output shaft 12 on needle bearings 14, and the opposite end is carried in a ball bearing 16 mounted in the casing 18 of the transfer box and retained therein by an annular ring 20 and a bracket or adapter 22 suitably secured to the casing 18. The shaft 12 is journalled in roller bearings 24, one of which is shown. Integral with the shaft 12 is a high speed gear 26 having on its inner end a set of internal clutch teeth 28 adapted to be engaged by a mating set of external clutch teeth 30 on an outer axially shiftable clutch sleeve 32 telescoped with and splined to an intermediate multi-sectioned hub comprising a hub section 34 preferably tightly splined with respect to an inner shaft 10 so as to have no relative rotation with respect thereto, a second hub section 36 loosely splined with respect to the shaft 10 so as to possess a limited relative rotation with respect to the shaft 10, and a third section 38 similarly loosely splined with respect to the shaft 10, these hub sections being arranged coaxially and in tandem on the shaft 10 with the fixed hub section 34 axially intermediate or central of the two loosely held sections. All three sections are maintained in position on the shaft 10 between a collar 40 rotatable with the shaft 10 and a split ring 42.

The shiftable clutch sleeve 32 also includes a second set of external clutch teeth 44 which are shown in Fig. 2 engaged with a mating set of internal clutch teeth 46 carried by an input gear 48 journalled on needle bearings 50 carried on the shaft 10 so as to be freely rotatable relative to and on the shaft 10. As seen in Fig. 1, the input gear 48 meshes with a gear 52 of an idler gear cluster 54 which includes a second gear 56 that in turn meshes with the output shaft gear 26. The cluster gear 54 is suitably mounted in the casing 18 and the gear 56 meshes with a further pinion connected to a second output shaft (not shown) in a manner shown and described in the copending application of Albert E. Kimberly, Jr., Serial No. 530,602, filed April 12, 1944, now Patent Number 2,450,896.

The tight hub section 34 has internal splines, tongues, or teeth 60 which preferably fit mating splineways or grooves 61 (see Figure 3) between the splines, tongues, or teeth 62 of the shaft 10, without backlash. The internal splines, tongues, or teeth 64 of the hub section 38, however, are purposely made slightly thinner on each side of their axes than the splines 60 such that the teeth 64 are of less thickness than the width of the splineways 61 of the shaft 10 and thus thinner than the splines 60 of the hub section 34 by an amount, for example, between $\frac{2}{1000}$ths to $\frac{10}{1000}$ths of an inch, preferably about $\frac{5}{1000}$ths of an inch, which latter figure has been found to be suitable in actual practice, so as to provide for the aforesaid limited relative rotational or oscillatory movement of the hub section 38 with respect to the shaft 10 and consequently also with respect to the hub section 34. The hub section 36 also has thinned internal splines 66 similar to the splines 64 of the section 38 for permitting a similar limited relative rotational movement between the hub section 36 and the shaft 10 and hub section 34.

The hub section 34 has external teeth or tongues 68 circumferentially spaced by recesses or grooves 70 and the hub sections 36 and 38 have similar teeth 72 and 74 respectively, and recesses 76 and 78 respectively. Hence, the external teeth of each hub section may be of similar size, shape, and spacing and are preferably aligned axially when the axes of their respective internal teeth are also aligned axially.

The ends of the external hub teeth are preferably square with the axes of rotation where the hub sections abut, thus providing lateral or end faces 80 and 82 on the teeth 68, lateral faces 84 on the teeth 72, and lateral faces 86 on the teeth 74. Hence, when the hub sections 34 and 36 are at the limit of relative rotation permitted by the lost motion in the loose splined connection of the hub section 36 the lateral faces 80 and 84 overlap to provide blocking shoulders dependent upon the transmission setting and drive conditions to which further reference is hereinafter made.

The shiftable member or sleeve 32 has internal teeth generally designated by the numeral 88 circumferentially spaced by recesses 90 and which are of the same circular pitch as the external teeth of the hub sections with which they may be slidably interengaged. The teeth 88 are arranged in two axially spaced groups comprising the teeth 92 and 94 respectively, which are axially spaced by the annular recess 96 which is of sufficient width to permit the teeth 92 and 94 to straddle the teeth of the hub section 34 with operating clearance when the member 32 is in its low speed drive ratio position as seen in Fig. 2 and Fig. 4.

The outer ends respectively of the sleeve teeth 92 are preferably square with the axis of rotation to provide lateral faces 98 and 100 respectively, for abutting certain lateral faces 80, 82 respectively, of the external hub teeth to prevent disengagement of the sleeve from an engaged position while undergoing torque application.

In operation of the transfer case clutch mechanism the clutch sleeve 32 is shiftable manually by means (not shown) under control of the driver through the yoke 102 to any one of three positions: a neutral position wherein the clutch sleeve 32 is disengaged from the clutch teeth 28 and 46; a second position where it is clutched as shown in Fig. 2 with the clutch teeth 46 of the input gear 48 to obtain low speed ratio drive; and a third position where it is engaged with the clutch teeth of the output shaft 12 to establish high speed ratio drive.

It will be understood that when low speed ratio drive is established, drive is transmitted from the input shaft 10 to the loose hub sections 36 and 38 to the shift sleeve 32 thence through the clutch teeth 44, 46 to the gear 48 and through the idler cluster 54 to the high speed gear 26 which drives the output shaft 12. The gear 26 being larger than the idler gear 56 and the idler gear 52 being larger than the drive gear 48, a reduction drive is obtained between the shafts 10 and 12 when as previously stated the clutch teeth 44, 46 are engaged for low speed drive. High speed ratio drive is established by shifting the clutch sleeve 32 to engage the clutch teeth 28, 30 in drive, power then being transmitted directly from the input shaft 10 to the output shaft 12 through the hub section 38 and clutch sleeve 32. It will be noted that in the high speed position no drive is transmitted through the hub section 36. Moreover, that the teeth 94 of the sleeve 32 serve to maintain the teeth 74 of the hub section 38 in proper position to enable easy engagement therewith of the teeth 92 of the clutch sleeve in shifting to high speed position after passing between the teeth 68 of the intermediate hub section 34. In the neutral position of the sleeve 32 all three hub sections are engaged with teeth of the sleeve 32 thus facilitating easy shifting to a desired speed ratio position.

Figure 4 shows the relationship of the narrow teeth when the shift sleeve 32 is engaged in low speed ratio drive under drive torque conditions. The teeth 92 of the clutch sleeve 32 are just forward of the teeth 68 of the intermediate hub section 34 and receiving drive from the shaft 10 through the teeth 66 of the loose hub section 36 after the shaft 10 has taken up the lost motion in its splined connection, such that the teeth 60 and 68 of the central hub section 34 respectively lead the teeth 66 and 72 of the hub section 36 so as to rotatably displace or cause an overlap between the lateral faces 80 and 84 of the teeth 68 and 72 respectively to provide a shoulder 104 for blocking rearward movement of the sleeve 32, the said shoulder acting as an abutment for the face 98 of the sleeve teeth 92 and thus preventing disengagement of the clutch sleeve. It will be understood that when drive no longer exists, as by disengaging the master clutch, shift of the sleeve 32 to neutral or high speed position may readily take place, the teeth 92 of the clutch sleeve 32 being then readily passed between the teeth 68 of the intermediate hub section 34. The corners of the opposite ends of the teeth 92 may be slightly chamfered, if desired, to facilitate shifting.

Figure 5:
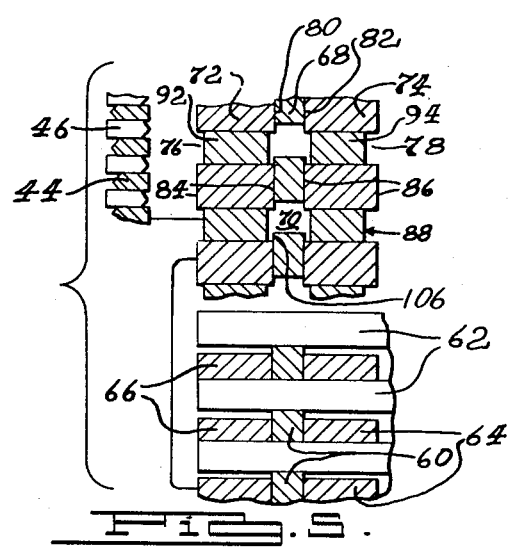
Fig. 5 is a similar development under coast torque conditions in low speed ratio drive.

Fig. 5 shows the relationship of the various teeth when the clutch sleeve 32 is engaged in low speed ratio drive as in Fig. 4, but undergoing coast torque. Here the gear 48 is the driver and the teeth 92 of the sleeve 32 drive the shaft 10 through the loose hub section 36. Under these conditions the teeth 66 and 72 of the hub section 36 rotatably lead the teeth 60 and 68 respectively of the hub section 34 so as to oppositely displace the lateral faces 80 and 84 of the teeth 72 and 68 respectively, from that relationship shown in Fig. 4 to provide a shoulder 106 for blocking rearward movement of the sleeve 32, the said shoulder acting as an abutment for the face 98 of the sleeve teeth 92 and thus preventing disengagement of the clutch sleeve.

Figure 6:
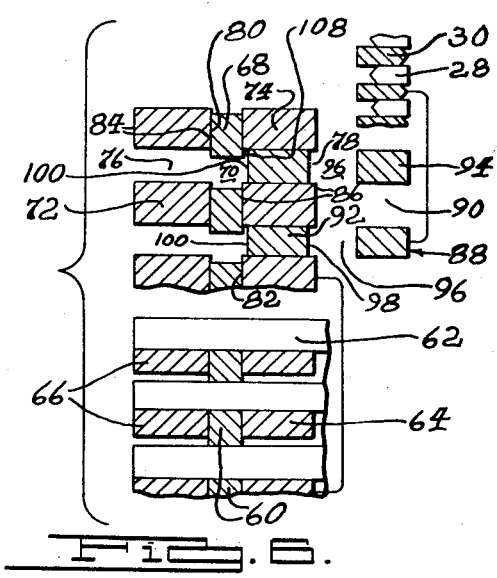
Fig. 6 is a similar development under drive torque conditions in high speed ratio drive.

Fig. 6 shows the relationship of the various teeth when the shift sleeve 32 is engaged in high speed ratio drive and undergoing drive torque application. The teeth of the shift sleeve 32 are just rearward of the teeth 68 of the intermediate hub section 34 and receiving drive from the shaft 10 through the teeth 64 of the loose hub section 38 after the shaft teeth 62 have taken up the lost motion between the shaft and hub section 38 such that the teeth 60 and 68 of the central hub section 34 respectively lead the teeth 64 and 74 of the hub section 38 so as to rotatably displace or cause an overlap between the lateral faces 82 and 86 of the teeth 68 and 74 respectively, to provide a shoulder 108 for blocking forward movement of the sleeve 32, the said shoulder acting as an abutment for the face or abutment 100 of the sleeve 92 and thus preventing disengagement of the clutch sleeve 32.

Figure 7:
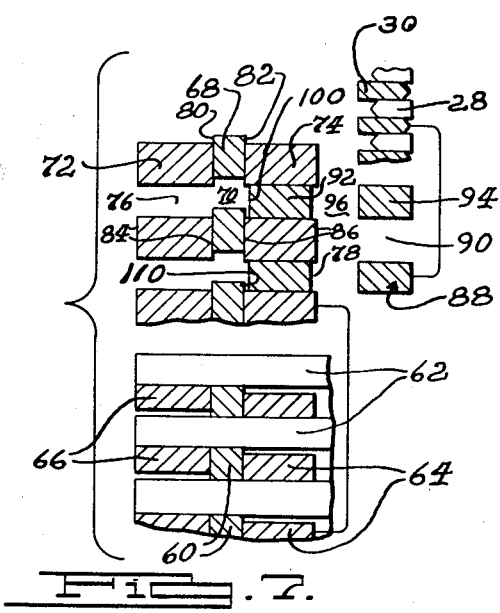
Fig. 7 is a similar development under coast torque conditions in high speed ratio drive.

Fig. 7 shows the relationship of the various teeth when the clutch sleeve 32 is engaged in high speed ratio drive as in Fig. 6, but undergoing coast torque application. Here the gear 26 is the driver and the teeth 94 of the clutch sleeve 32 drive the shaft 10 through the loose hub section 38. Under these conditions the teeth 64 and 74 of the hub section 38 rotatably lead the teeth 60 and 68 respectively of the central hub section 34 so as to oppositely displace the lateral faces 82 and 86 of the teeth 68 and 74 respectively, from that relationship shown in Fig. 6 to provide a shoulder 110 for blocking forward movement of the clutch sleeve 32, the said shoulder acting as an abutment for the face or abutment 100 of the clutch sleeve 92 and thus preventing disengagement of the clutch sleeve.

From the above description, it will be seen that I have provided novel means for preventing disengaging movement of the shiftable clutch member of a gear mechanism such as an automotive transfer case from either of its high speed ratio or low speed ratio drive positions of engagement and regardless of whether the clutch sleeve be undergoing drive torque or coast torque application. While the particular structure shown and described above is well adapted for carrying out the various objects of my invention, it will be understood that various modifications, changes, and substitutions may be made without departing from the spirit thereof. The subject invention is therefore, to be construed to include all such modifications, changes, and substitutions as may come within the scope of the following claims.

I claim:

1. In a transmission clutch mechanism the combination of an inner member, an outer member, a first intermediate section, a second intermediate section and a third intermediate section, said members and sections being rotatable as a unit about a common axis and said second section being intermediate the said first and third sections, said second section being non-rotatably associated with one of said members and said first and third sections having a limited rotation relative to the same member, the other of said members and said intermediate sections being relatively shiftable axially for establishing a driving relationship between said members through one of said first and third sections independently of said second section.

2. In a transmission clutch the combination of an inner member, an outer member, a first intermediate section, a second intermediate section and a third intermediate section, said members and sections being rotatable as a unit about a common axis and said second section being intermediate said first and third sections, said second section being non-rotatably associated with one of said members, said first and third sections having a limited rotation relative to the same member, and the other of said members being shiftable axially relative to said sections to positions establishing a driving relationship between said members through said first or third sections; there being portions on said second section adapted to hold the shiftable member from shifting out of its position establishing said drive relationships when torque is being applied through said first or third sections and said latter section through which torque is applied is at the limit of its said relative rotational movement.

3. In a transmission clutch the combination of an inner member, an outer member, a first intermediate section, a second intermediate section and a third intermediate section, said second intermediate section being non-rotatably carried by said inner member and being connected through interlocking tongues and grooves with said outer member, said first and third sections having a lost motion connection with said inner member permitting a small amount of relative rotation between them and said second section and connectible through interlocking tongues and grooves with said outer member; said outer member being selectively shiftable to positions of connection with said first and third sections and disconnected from said second section whereby a driving relationship is selectively established between said members through said first and third sections, the tongues of said outer member when in either of said driving relationships being adapted to become rotatably overlapping relative to the tongues of said second section upon torque being applied through the said first or third section in connection with said outer member to take up said relative rotation whereby the said overlapped portions of said tongues of said second section serve to block disengaging movement of said outer member relative to said first or third section with which it is in driving relationship.

4. In a transmission clutch mechanism the combination of an inner member, an outer member, a first intermediate section, a second intermediate section and a third intermediate section, said sections having alignable external tongues respectively interengageable with tongues on said outer member and having internal tongues respectively interengaged with tongues on said inner member whereby the members and sections are rotatable as a unit about a common axis, said outer member being shiftable to selective positions engaged with certain of said sections and said internal tongues of said first and third sections being of less thickness than the tongues of said inner member interengaged therewith to permit a limited oscillatory movement between said inner member and said first and third sections whereby the external tongues of said first and third sections may become misaligned relative to the external tongues of said second section to block axial disengaging movement of said outer member from a position of drive engagement with either of said first and third sections when torque is being applied from one member to the other.

5. In a transmission change speed mechanism first and second toothed clutching members, a shiftable toothed clutching member selectively engageable with said clutching members, a drive transmitting member and first, second, and third intermediate members, the latter members having tongues interengaged with tongues on said drive transmitting member and having other tongues respectively adapted to be interengaged with teeth of the shiftable member whereby a driving connection may be established between said first clutching member and said drive transmitting member through said first intermediate member when said shiftable member is positioned in clutching engagement with said first clutching member and whereby a driving connection may be established between said second clutching member and said drive transmitting member through said third intermediate member when said shiftable member is positioned in clutching engagement with said second clutching member, the tongues of said first and third intermediate members being of lesser thickness than those of the said drive transmitting member interengaged therewith to permit a limited oscillatory movement between these intermediate members and the drive transmitting member whereby the other tongues of said intermediate members may become misaligned relative to the tongues of said second intermediate member engageable with said shiftable member whereby to block disengagement of said shiftable member from its positions of engagement with said first or second clutching members when torque is being applied between the latter and said drive transmitting member.

6. In a power transmitting mechanism two rotatable parts each having a set of clutch teeth; a third part adapted for selective drive relation with said two parts; a tri-sectioned hub structure carried by said third part intermediate said two parts and comprising juxtaposed sections; a shift device having drive connection with said hub structure and having clutch teeth adapted for selective positioning in clutching engagement with the clutch teeth of said two rotatable parts, said shift device being disconnected from one of said rotatable parts when in clutching engagement with the other thereof; said hub sections having external tongues adapted to be aligned when said shift device is shifted between its positions of clutching engagement and two of said hub sections having a splined connection with said third part so constructed and arranged as to provide a predetermined oscillatory movement between these hub sections and said third part whereby the said alignable teeth of the third hub section may become misaligned with respect to the other hub sections when said shift device is in clutching engagement with either of said two rotatable parts for transmission of torque through said mechanism.

7. In a power transmitting mechanism two spaced rotatable parts each having a set of clutch teeth; a third rotatable part coaxial with said two parts; a tri-sectioned hub structure carried by said third part intermediate said two parts and comprising first, second, and third sections arranged in tandem; a shift device having drive connection with said hub structure and having clutch teeth adapted for selective positioning in clutching engagement with the clutch teeth of said two parts, said shift device being drivingly connected to said first and third sections when in clutching engagement with one of said two parts and being drivingly connected to only said third section when in clutching engagement with the other of said two parts; said hub sections having external tongues adapted to be aligned to facilitate shift of said shiftable device between its said clutching positions and said first and third sections having a lost motion connection with said third part providing a limited predetermined relative rotational movement between these sections and said third part whereby said alignable teeth of said hub sections may be misaligned with the external teeth of said second section when said shift device is in either clutched position and undergoing torque transmission.

8. In a power transmitting mechanism, a pair of spaced power transmitting members each having a set of clutch teeth; a power transmitting shaft coaxial with said members having radial tongues and grooves; a tri-sectioned hub structure carried by said shaft and comprising juxtaposed first, second, and third sections each having internal and external radial tongues and grooves, the internal tongues being interengaged with the tongues of said shaft and the external tongues being alignable axially; a shift device having internal tongues interengageable with the external tongues of said hub sections and being selectively shiftable axially into clutching engagement with said spaced power transmitting members; the internal tongues of said first and third sections being of less thickness than the width of the grooves of said shaft in which they are engaged to provide for a limited oscillatory movement between these sections and said shaft whereby the external tongues of said sections may be misaligned with respect to the external tongues of the second section when the shift device is engaged with either of said spaced power transmitting members and undergoing transmission of torque, the tongues of said shift device being arranged in axially separated groups respectively engageable with said first and third hub sections when said shift device is clutched with one of said power transmitting members, the said groups of tongues then straddling the external tongues of said second hub section and one only of said groups of tongues of said shift device being engageable with said third hub section when said shift device is clutched with the other of said pair of spaced power transmitting members.

9. In a power transmitting mechanism a pair of spaced power transmitting members each having a set of clutch teeth, a power transmitting shaft coaxial with said members having radial tongues and grooves; a tri-sectioned hub structure carried by said shaft comprising first, second, and third sections arranged in tandem, the first and third sections having internal tongues of lesser thickness than the grooves of said shaft whereby said first and third sections have a limited relative rotation relative to said shaft and said second section having internal tongues fitting the grooves of said shaft so as to be non-rotatable relative thereto; each of said hub sections having external tongues alignable axially; a shift device having two sets of spaced-apart internal tongues, said sets of internal tongues being respectively interengageable with the external tongues of said first and third sections when said shift device is in clutching engagement with the clutch teeth of one of said pair of power transmitting members and the said shift device then having its said sets of internal tongues straddling the external tongues of said third hub section, and one of said sets of internal tongues of said shift device being engageable with the external tongues of said third hub section and being disengaged from the external tongues of said first and second sections when said shift device is clutched in engagement with the clutch teeth of the other of said pair of power transmitting members.

10. In a transmission clutch mechanism the combination of an inner member, an outer member, blocker means on said inner member, a pair of intermediate sections on opposite sides of said blocker means, said members and sections being rotatable as a unit about a common axis and said pair of sections having limited rotational movement relative to said inner member, the outer member being shiftable axially relative to said sections to positions establishing a drive relationship through at least one of said sections, and said blocker means being adapted to hold the outer shiftable member from shifting out of its position establishing said drive relationship when torque is being applied through said section having a drive relationship therewith and said latter section is at the limit of its said relative rotational movement.

11. In a transmission clutch mechanism the combination of an inner member, an outer member, a pair of intermediate sections, said members and sections being rotatable as a unit about a common axis, said pair of sections having a limited rotation relative to one of said members, the other member and sections being relatively shiftable axially for establishing a driving relationship between said members through at least one of said sections, and blocker means intermediate said sections for preventing relative axial movement between said members when torque is being applied therebetween through at least one of said sections and relative rotation has occurred between said one section and said one member.

12. In a transmission clutch the combination of an inner member, an outer member, first, second, and third intermediate sections, said members and sections being rotatable as a unit about a common axis, said sections having alignable tongues interengageable with tongues on one of said members and having a splined connection with the other of said members, said one member being shiftable to selective positions engaged with certain of said sections and said splined connection providing for limited permissible relative rotation between two of said sections and the third section whereby their alignable tongues may become misaligned to block disengagement of said one shiftable member from a position of drive engagement with either of said two sections when torque is being applied from one member to the other.

13. In a transmission change speed mechanism a first gear having a toothed clutching element and a second gear having a toothed clutching element, a shiftable clutching member having axially spaced clutching elements selectively engageable respectively with the toothed clutching elements of said first and second gears, a toothed drive transmitting member and tandemly arranged first, second and third intermediate sections, the said sections having tongues engageable with the teeth of said drive transmitting member and having other tongues engageable with the clutching elements of the shiftable member whereby a driving connection may be established between said first gear and said drive transmitting member through said first section when said shiftable member is positioned in clutching engagement with the clutching element of said first gear and whereby a driving connection may be established between said second gear and said drive transmitting member through said third section when said shiftable member is positioned in clutching engagement with the clutching element of said second gear, there being a lost motion connection between the teeth of said drive transmitting member and the tongues of certain of said sections engaged therewith to provide a limited oscillatory movement between the latter and said drive transmitting member whereby the said other tongues of said first and third intermediate sections engageable with said shiftable member may become misaligned relative to the other tongues of said second section to block disengagement of said shiftable member from its said positions of engagement with said gears when torque is being applied between the latter and said drive transmitting member.

ALVA B. GILBERT.

REFERENCES CITED

The following references are of record in the file of this patent:

UNITED STATES PATENTS

| Number | Name | Date |
|---|---|---|
| 1,935,965 | Wahlberg | Nov. 21, 1933 |
| 2,070,140 | Peterson et al. | Feb. 9, 1937 |
| 2,125,526 | Trumbath | Aug. 2, 1938 |
| 2,140,216 | Wessman | Dec. 13, 1938 |
| 2,202,271 | Sinclair | May 28, 1940 |
| 2,397,943 | Bull | Apr. 9, 1946 |